May 5, 1931. W. H. MUSSEY ET AL 1,803,482
CONDUIT STRUCTURE FOR RAILWAY CARS
Filed July 26, 1929 3 Sheets-Sheet 1
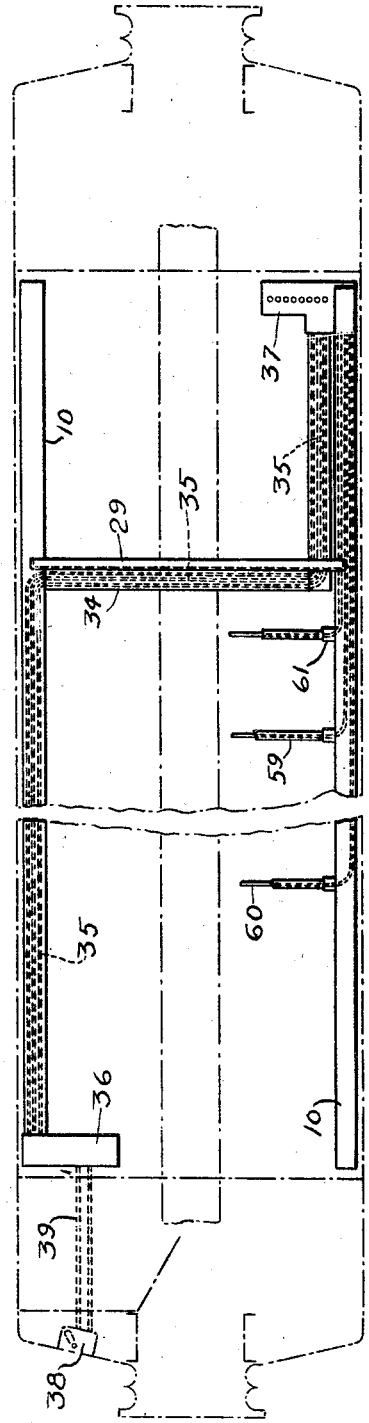
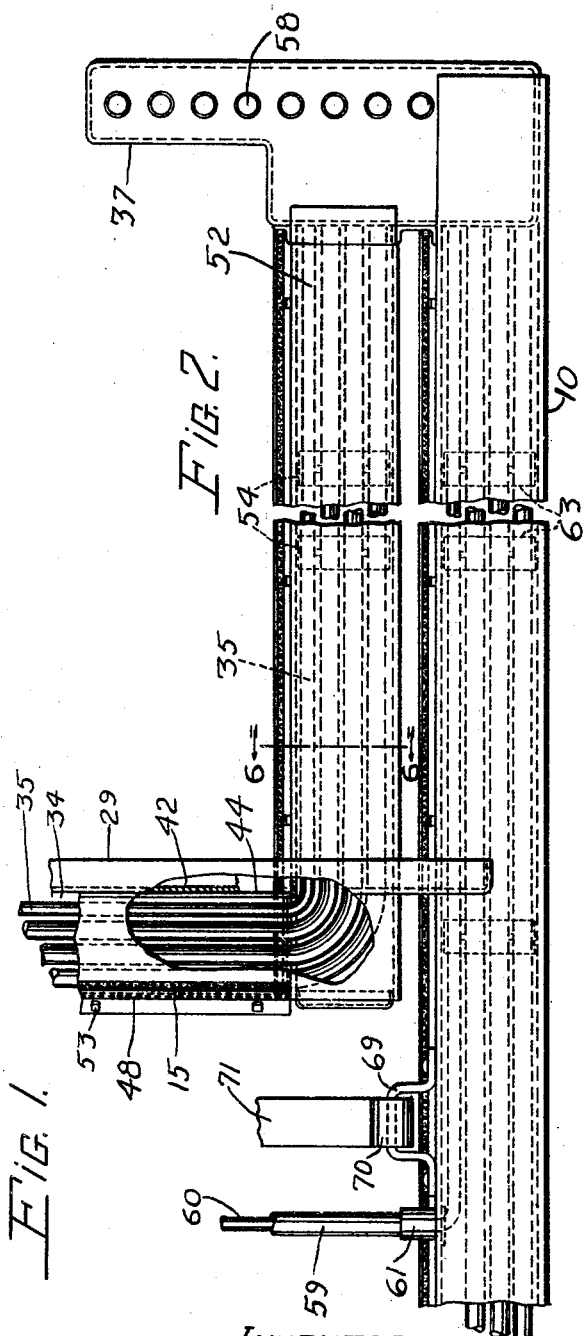
INVENTORS:
WILLIAM H. MUSSEY &
HARRY A. HELLMAN.
by Oscar Hochberg
Their ATTORNEY

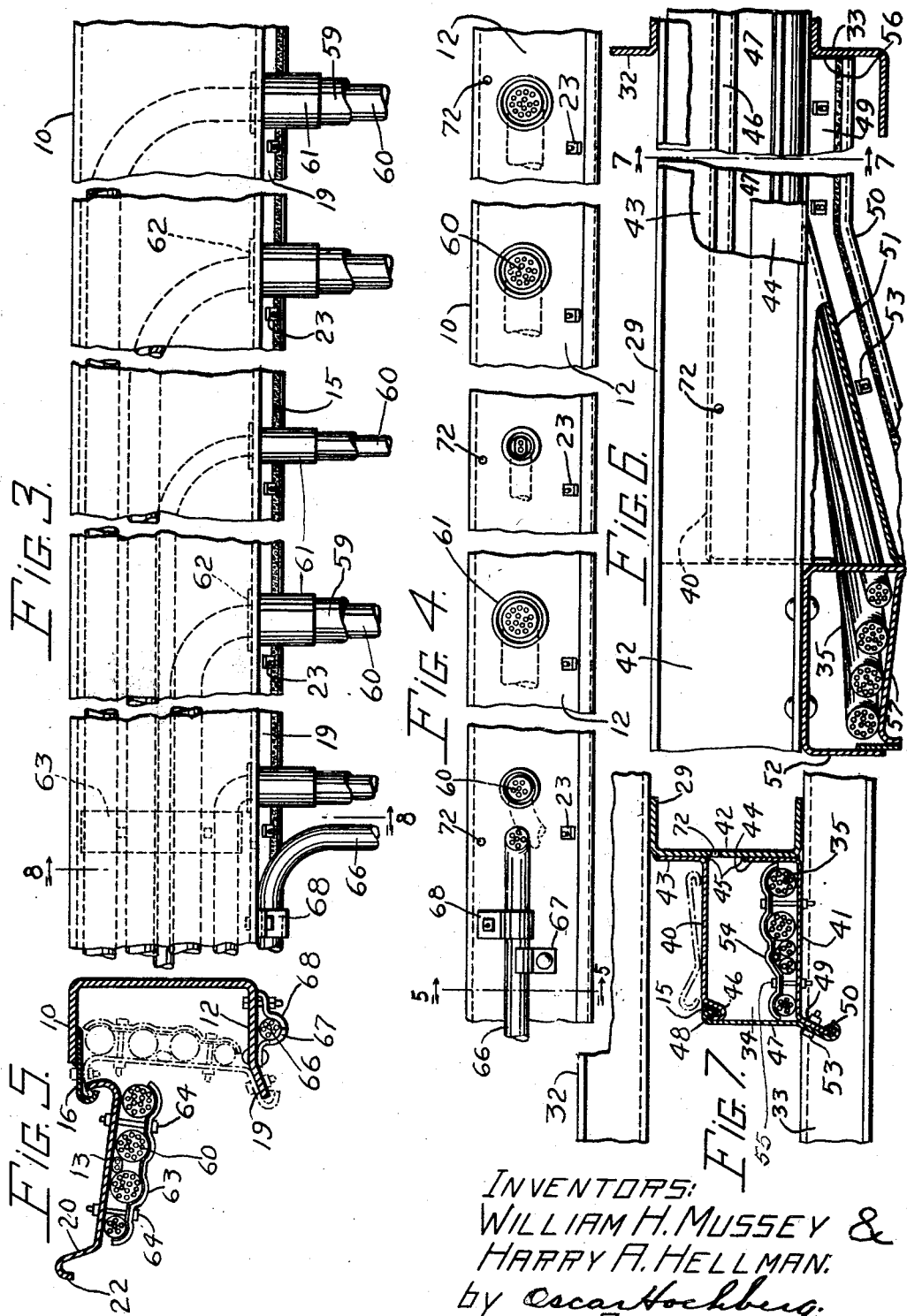

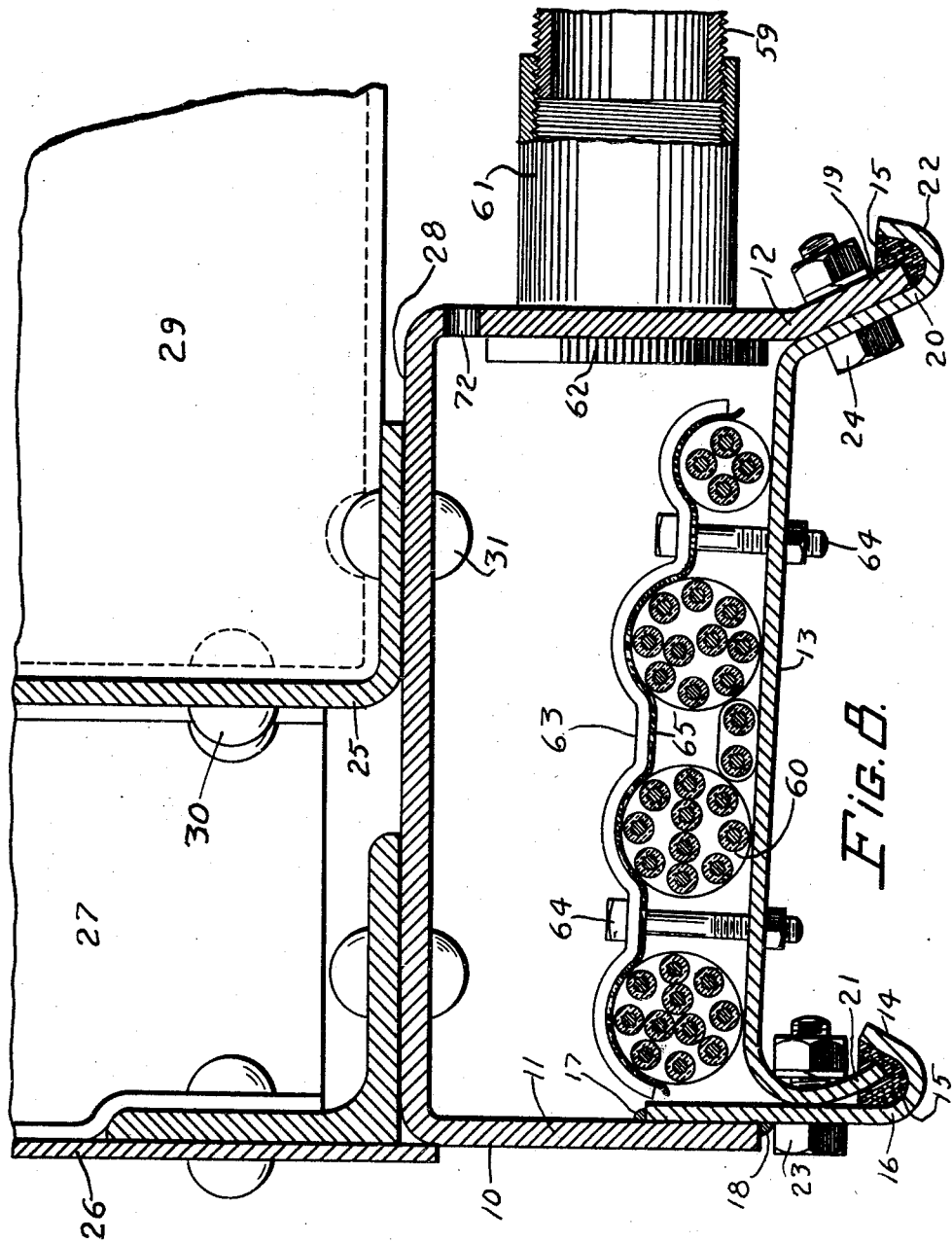

Patented May 5, 1931

1,803,482

UNITED STATES PATENT OFFICE

WILLIAM H. MUSSEY AND HARRY A. HELLMAN, OF CHICAGO, ILLINOIS, ASSIGNORS TO THE PULLMAN CAR & MANUFACTURING CORPORATION, OF CHICAGO, ILLINOIS, A CORPORATION OF ILLINOIS

CONDUIT STRUCTURE FOR RAILWAY CARS

Application filed July 26, 1929. Serial No. 381,332.

The invention relates generally to conduit systems for railway cars for the purpose of supporting and disposing the power distribution cables, and particularly to the structure of such conduits.

The invention further contemplates the combination of such conduits with the car supporting member of the underframe whereby such conduits lend themselves to the underframe structure to provide stress members forming an integral part of the car framing system.

The principal object of the invention is to provide suitable cable-supporting and housing conduits wherein the cables may be supported and disposed in a manner readily accessible for inspection, repair, or replacement and installation, and free from possible injury from the elements or the accumulation of dirt and moisture to which such cables have heretofore been exposed.

A further and important object is to provide conduits of such dimensions as to amply care for the required number of cables at predetermined points in the distribution system.

A further object is to provide suitable protection and support to groups of cables which have heretofore been individually enclosed in conduits of a size large enough to receive the several cables but which have been subjecting such cables to injury caused by the friction of the insulation within the bore of the conduit designed to receive them.

It is proposed by the use of the conduits herein disclosed to provide ample provision for the orderly disposition of the cables in group formation and suitable fastening means therefor within housings large enough to contain all of the power lines extending along strategic points in the distribution system.

The foregoing and other advantages are attained by the mechanism illustrated in the accompanying drawings, in which Figure 1 is a plan view of a car equipped in accordance with the invention showing certain stress members of the car structure arranged to receive and support certain power distributing cables of the system;

Figure 2 is an enlarged fragmentary plan view of a portion of the system illustrated in Figure 1 and showing the conduits terminating at adjacent junction box and switchboard locker;

Figure 3 is a similar view showing the manner of diverting the contained cables of the conduits through individual conduits and unions at spaced intervals along the main conduit member;

Figure 4 is a side elevational view of the same;

Figure 5 is a vertical cross sectional view through the main conduit member taken on line 5—5 of Figure 4 showing the manner of mounting the cables within the conduit and supporting them upon the closure member secured to the conduit;

Figure 6 is a vertical sectional view taken through an auxiliary conduit member immediately adjacent a cross member of the underframe structure and taken on line 6—6 of Figure 2 illustrating the manner of disposing the cables for connection with control devices at points intermediate the sides of the car or to the conduit at the opposite side of the car;

Figure 7 is a vertical sectional view through said cross member taken on line 7—7 of Figure 6 showing the manner of integrating conduit and cross bearer members and showing the relative disposition of said members and center sill of said car structure; and Figure 8 is an enlarged vertical sectional view through one of the main stress members taken on line 8—8 of Figure 3 showing the member formed as a housing and the cable supporting closure for said housing.

It has heretofore been the practice to dispose and support the power line and switch control cables underneath the car, either by loosely connecting them to the supporting underframe of the car or threading them through tubular conduit members. The practice required the stringing in of the several cables through individual tubes hardly large enough to accommodate them and invariably resulted in some damage to the protecting insulation about the cables so that short-circuiting between the wires forming such cables was not an infrequent occurrence, culminating at times in the total destruction of the power carrying media. The conduits thus provided, if any, were secured to the stress members of the car and subjected to the vibratory and weaving movements of the supporting car structure, resulting in the total disruption of the conduit connections and contributing to the premature disintegration of the distributing system.

By the disposition of the power cables in the manner hereinafter described and supporting and housing them in members comprising constituent elements of the car framing structure, it is proposed to shield the power distributing and control system in a manner impossible of attainment with the relatively crude methods and structures heretofore available for that purpose. The arrangement eliminates the necessity for providing an excessive number of openings in the supporting framing of the car structure for the relatively large number of separate conduits heretofore considered indispensable, and preserves the integrity of the stress transmitting elements of the car without sacrificing any of the space beneath the car customarily devoted to other uses.

In the drawings, 10 represents one of the conduits for housing certain cables of the power system, constituting one of the longitudinal side sill supporting members of the car framing. The sill is preferably channel shaped with its open side facing downwardly, although it may obviously be arranged or formed with open sides disposed laterally of the beam should the conditions require that disposition of the conduit opening. As best shown in Figure 8, the depending flanges 11 and 12 of the side sill are formed with their lower margins bent to provide sealing and supporting portions for the closure 13. Flange 11 is formed with its margin bent inwardly and upwardly to provide a trough shaped ledge 14 adapted to hold a closure sealing composition 15, such as asphaltum or other compound.

It will be noted that the trough portion of the sill flange 11 is fashioned from a separate plate 16 arc welded to the flange at 17 and 18 as shown in Figure 8. The separate plate is used to facilitate manufacture since it would be inexpedient to form the edge of a relatively thick plate of sill length with an integral marginal trough portion as shown, although it could be done should that arrangement be insisted upon. The inner flange 12 of the sill has its edge portion 19 deflected outwardly to provide an inclined plane engagement with a correspondingly inclined edge portion 20 on closure plate 13. To enable closure 13 to swing downwardly from its support on trough edge 14, the adjacent edge of the closure plate is formed with a downwardly curved flange 21 designed to prevent separation of closure when swung downwardly to position indicated in Figure 5, and to permit withdrawal of said flange from the sealing compound without danger of distortion of the flange or pinching of the compound.

The opposite inclined edge portion 20 of the closure is formed with a trough shaped sealing portion 22 opening upwardly and adapted to receive the deflected edge portion 19 of sill flange 12 and a sealing compound 15 as best illustrated in Fig. 8. Suitable fastening bolts 23 and 24 secure the closure to the sill through closure flanges 21 and 20, respectively, and adjacent sill flanges 11 and 12, and are located at spaced intervals throughout the length of the sill member. Thus secured, the closure 13 materially enhances the value of the side sill 10 as a stress member in the framing assembly since it prevents the outward buckling of the sill flanges 11 and 12 under load, forming a tubular stress member to function as a bottom chord when assembled with superposed framing members constituting inner and outer girder plates 25 and 26 respectively, spaced apart and connected by framing posts 27.

The inner girder wall is spaced outwardly from the plane of the inner flange 12 of sill 10 as shown in Figure 8 to provide a supporting ledge 28 for flanged crossbearer member 29 of the car framing, the crossbearer being secured to wall and sill members by rivets 30 and 31, respectively.

The crossbearer is assembled with the center sill of the car underframe between upper and lower chords 32 and 33 of the sill as best shown in Figures 6 and 7, and extends from side to side of the car. In the present embodiment of the invention, the crossbearer forms part of a crossover housing 34 for supporting a group of cables 35 connecting junction boxes 36 and 37 at opposite sides and ends of the car, the terminals in box 37 connecting with switchboard (not shown) at adjacent end of the car, and certain of the cable terminals in box 36 having electrical connection with motorman's control box 38 through conduits 39 as indicated in Figure 1.

The housing 34 is formed by the junction of upper and lower wall members 40 and 41 respectively, with the web 42 of crossbearer 29. The upper and lower wall members are each provided with attaching flanges 43 and 44 secured to the crossbearer web in any approved fashion but preferably by arc welding along the seams as shown at 45.

The upper wall member is formed at its marginal edge with a trough portion 46 to provide a seal for a cover 47 having a re-entrant upper flange 48 designed to enter the trough 46 for embedment in a sealing compound 15 held in the trough. The cover has its lower marginal edge deflected to provide inclined plane engagement with a correspondingly deflected edge 49 on the lower wall and is formed with an upwardly opening trough portion 50 designed to carry a compound 15 to provide a seal for the flange 49.

The cover 47 is secured to the housing 34 by means of bolts 53 spaced apart throughout its length, and held rigidly in position to protect the contained group of cables from unauthorized tampering. The cables are held from displacement by spring clamps 54 held down by bolts 55 secured to the lower wall 41 of the housing as shown in Figure 7. It should be noted that the housing upper wall is spaced downwardly from the center sill upper chord 32, the space thus provided being adapted to serve as a temporary support for the housing cover positioned as indicated in broken lines in this figure during inspection periods. At the center sill lower chord position, both cover 47 and flange 49 of the housing lower wall 41 are cut away to provide an intermediate recess 56 to clear the portion of the center sill beneath the housing.

To provide continuous support for the cables 35 contained in the crossover housing 34, portions 51 of the lower wall 41 adjacent the side sills are sloped downwardly below the crossbearer 29 for connection with auxiliary housing 52 extending beneath the crossbearer, as best shown in Figure 6, and with opposite side sill. Communicating passages are thus established between the housings for the cables 35 which enter the auxiliary housing 52 through an opening in the end of adjacent side of said housing.

The auxiliary housing is fitted with a drop closure portion 57 of the type indicated for the side sills 10 shown in Figure 8. The closure provides a support for the cables 35 for the length of the housing to the junction box 37, sufficient slack being provided adjacent the junction of the housings and at the junction box to permit lowering of the closure 57 for inspection or installation of the cables, without unduly straining the cables or their fastenings 54. At the junction box 37 the cables are severally passed through certain of the conduits 58 leading upwardly to cutout switches and fuse blocks of the system in the switchboard locker (not shown).

Certain of the conduits 58 receive the cables 60 of the group confined in side sill housing 10 best shown in Figures 3, 4, 5, and 8. These cables are independent of group 35 in auxiliary and cross over housing, and are connected with various remote control switches (not shown) in the power line circuit at adjacent side of the car. The cables 60 are shunted at various points along the length of sill housing 10 and severally entered in conduits 59 respectively tapped into couplings 61 held to housing flange 12 by bushings 62 seated in openings spaced at intervals along the sill as best indicated in Figures 3, 4, and 8.

The cables are held by spring clamps 63 secured by bolts 64 taking the closure plate, the clamps being arranged at spaced intervals along the housing and sufficiently removed from bushings 62 at the branch conduits 59 to permit slack in the cables to allow closure 13 with attached cables to drop to position indicated in Figure 5 for installation or inspection purposes. To prevent chafing of the cable insulation, strips of padding 65 may be introduced between the cables and the several clips, and similar provision may be afforded beneath the cables if desired to avoid scuffing of the insulation between the cables and closure plate. Due to variations in temperature of the air in the housings provision is made to allow escape of air from or entrance to the housings by forming a number of so-called breather openings 72 in the side walls adjacent the upper walls to prevent destruction of the closure seals by unbalanced air pressure, as shown in Figures 4, 6, and 8.

It is desirable to support high tension cables in heater and motor circuits independently of and separately from the relatively low voltage switch control 35 and 60. For this purpose the high tension cables may be carried in conduits 66 held to adjacent side sill wall 12 by supporting clip 67 and removable clamp 68 arranged as shown in Figures 3, 4, and 5. The side sill housing 10, functioning as a stress member, may also be utilized for carrying storage battery or tool boxes customarily hung from the underframe of the car. As best shown in Figure 2, staples 69 to the number required may be secured to the sill and formed to receive respectively adjacent hooks 70 on bent supporting brackets 71 adapted to carry the battery boxes without interfering with the cable layout.

The construction and arrangement of the cable housings as outlined will facilitate identification of the several cables and conduits of the system and avoid the somewhat confusing network of conduits heretofore required to protect and support the individual cables, and the necessity for distinctively marking the several conduits is reduced to a minimum. The system also lends itself intimately to the framing structure of the car and permits an orderly and safe grouping of the cables, is easily and economically installed and readily accessible for inspection. As arranged, the system provides for the convenient connection of the cables with the switchboards and associated control devices on the car.

What we claim is:—

1. In a railway car, a conduit system comprising a series of car framing members operatively connected and formed to provide cable housings, cables supported within said housings, and closure members supporting certain of said cables.

2. In a railway car, a plurality of supporting frame members extending longitudinally and upon opposite sides of the car and formed to provide cable housings, and a transverse housing connecting said members, said transverse housing member constituting a crossbearer in the framing assembly.

3. In a railway car, a plurality of cable housings constituting longitudinal and transverse members of the supporting frame structure, closures detachably secured to said housing, and cables supported within said housings and carried upon certain of said closures.

4. In a railway car, the combination comprising junction boxes arranged at diagonally opposite corners of the car, supporting frame members connecting said boxes and formed to provide cable housings, and cables carried by said housings and having their terminals in said boxes.

5. In a railway car, a longitudinal supporting frame member formed to provide a channel shaped housing having an open side, and a detachable closure plate pivotally mounted on said housing.

6. In a railway car, a longitudinal supporting frame member formed to provide a channel shaped housing having an open side presented downwardly, a detachable closure plate pivotally mounted on said housing, and sealing means for said plate and housing.

7. In a railway car, a plurality of main longitudinal supporting members formed to provide housings in the framing assembly, a transverse connecting crossbearer supported upon said members, and an auxiliary longitudinal housing adjacent one of said main longitudinals terminating at said crossbearer.

8. In a railway car, a plurality of main longitudinal supporting members formed to provide housings in the framing assembly, a transverse connecting crossbearer supported upon said members, upper and lower wall plates complementing said crossbearer to form therewith a housing communicating with one of said main housings, and an auxiliary longitudinal housing adjacent one of said main longitudinals having operative connection with said transverse housing.

9. In a railway car, a plurality of cable housings constituting longitudinal and transverse members of the supporting frame structure, cables supported within said housings, and branch conduit members secured to certain of said housings to severally enclose certain of said cables.

10. In a railway car, a plurality of cable housings constituting members of the supporting frame structure, low tension cables supported within said housings, high tension cables supported upon said members outside of said housings, and branch conduit members secured to certain of said housings to severally enclose certain of said cables.

11. In a railway car, a plurality of cable housings constituting members of the supporting frame structure, cables supported within and exteriorly of said housings, and means secured to said housings for severally enclosing certain of said cables.

12. In a railway car, a conduit system comprising a plurality of supporting frame members including a hollow side sill opening downwardly and formed with depending flanges spaced apart, and a closure plate for said opening detachably secured at their opposite margins to respectively adjacent sill flanges.

13. In a railway car, a conduit system comprising a plurality of supporting frame members including a hollow side sill opening downwardly and formed with depending flanges spaced apart, a closure plate for said opening having shaped marginal securing flanges adapted for connection with respectively adjacent flanges of said sill, and removable devices for detachably securing said plate.

14. In a railway car, a conduit system comprising a plurality of supporting frame members including a hollow side sill opening downwardly and formed with depending flanges spaced apart, a closure plate for said opening having shaped marginal securing flanges detachably connected with respectively adjacent flanges of said sill, and sealing means closing the joints between said flanges.

In witness whereof we have hereunto set our hands this 19th day of July, 1929.
WILLIAM H. MUSSEY.
HARRY A. HELLMAN.